Nov. 8, 1966  C. P. HAYNES  3,283,585
GAS SAMPLING SYSTEM
Filed July 15, 1964

Inventor
CHARLES P. HAYNES

Agent
CARL D. FARNSWORTH

р

United States Patent Office 3,283,585
Patented Nov. 8, 1966

3,283,585
GAS SAMPLING SYSTEM
Charles P. Haynes, Hammond, Ind., assignor to Mobil Oil Corporation, a corporation of New York
Filed July 15, 1964, Ser. No. 382,755
8 Claims. (Cl. 73—421.5)

This invention is concerned with gas sampling systems and, more specifically, with flue gas sampling systems.

There are many types of systems for this purpose, some very elaborate. Most of them are composed, at least in part, of items made from materials subject to corrosion. While a certain amount of piping complication is necessary for accurate operation, many systems are far more complicated than advisable for the purpose intended. Over-complication tends to increase maintenance problems, such as leakage and plugging of equipment, and to minimize opportunity to detect such defects.

A further objection to such systems is the lack of ability for quick and easy adjustment of flow rates, particularly if dependence is had upon conventional metering devices.

This invention has for its object the provision of a gas sampling system which may be constructed in its entirety of non-corrosive materials. Another object is the provision of such a system comprised almost entirely of relatively flexable tubing. A particular object and, of major importance, is a provision of a system in which transparent and easily adjustable components may be used at appropriate control points in the system.

A further object is the provision of a gas sampling system wherein a continuously flowing current sample of the gas is available either for intermittent or continuous analysis, or for intermittent analysis in a cyclic system operated to handle a plurality of samples.

Still another object is the provision of a gas sampling system in which no moving parts subject to corrosion or the accumulation of deposits are exposed to the gas streams.

These and other objects which may appear hereinafter are achieved by the system disclosed herein.

The system may be understood more thoroughly by consideration of the drawings attached to and made a part of this disclosure.

In the drawings, which are wholly in diagram form:

Figure 1:
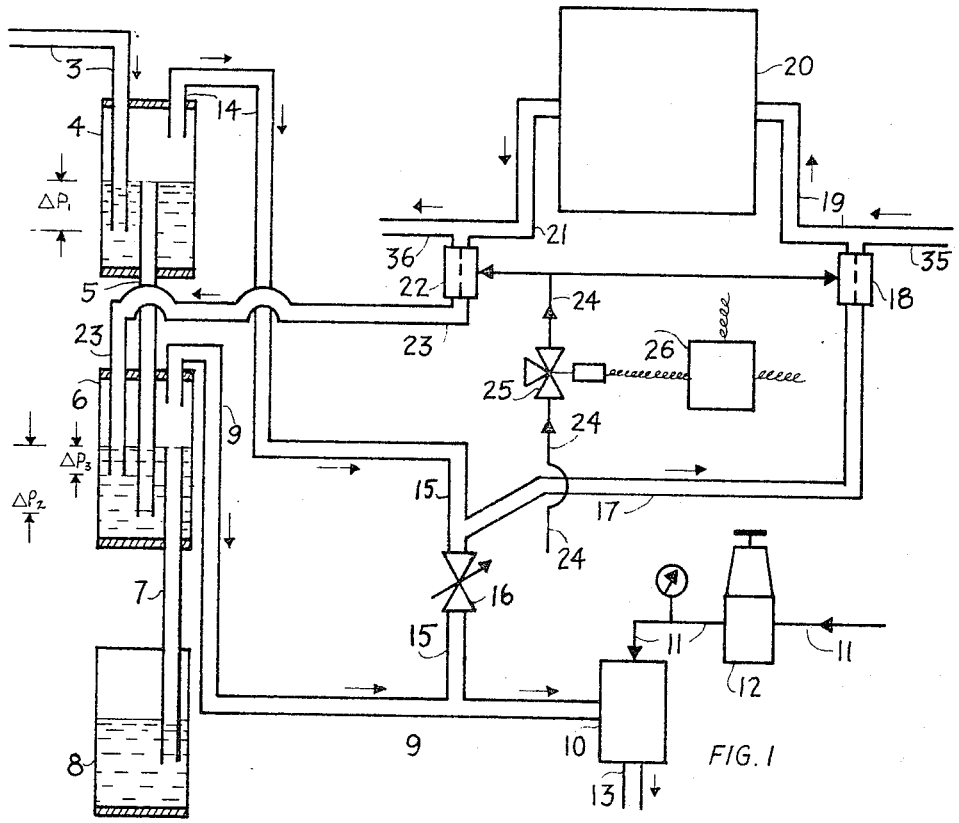
FIGURE 1 shows a generalized layout of a preferred system.

In FIGURE 1 of the drawing, the sampling system is shown in diagram form. It consists of a sample probe 3, delivering into a sealed pot 4, at a point below the level of fluid therein, designated by a distance (expressed as pressure) $\Delta P_1$. The level of fluid in pot 4 is determined by the position of tube 5, which combines the functions of an overflow pipe and gas flow duct.

Tube 5 leads downwardly to a second sealed pot 6, and is immersed below the surface of fluid therein by a distance, again expressed as a pressure, $\Delta P_2$. The level of fluid in pot 6 is determined by the position of tube 7 which leads downwardly to pot 8, which contains fluid, and is open to the atmosphere.

A tube 9 leads from the top of sealed pot 6 to an aspirator 10, in which a suction can be established by compressed air flow, originating in line 11, regulated by regulator 12, with discharge to atmosphere at 13.

From the top of sealed pot 4 a tube 14 leads to a by-pass tube 15 in which there is installed an adjustable valve 16.

Flow from the sample probe 3 into and through the system can be established in the following manner. With adjustable valve 16 closed, the aspirator 10 is brought into operation, inducing flow through sample probe 3 into pot 4, through tube 5 into pot 6, and through tube 9 to the aspirator 10. The rate of flow can be adjusted by regulating the rate of bubbling in pot 4, and should be low enough to avoid excessive agitation and foaming. The degree of vacuum so impressed upon the system can be controlled by the height of fluid in tube 7, since pot 8 is open to the atmosphere.

Adjustable valve 16 in by-pass tube 15 can be opened a controlled amount to establish a flow through tubes 14 and 15, resulting from the differential between $\Delta P_1$ and $\Delta P_2$, $\Delta P_1$ being less than $\Delta P_2$. The flow rate through 14–15 can be noted by observing the difference in bubbling rates in pots 4 and 6.

Figure 2:
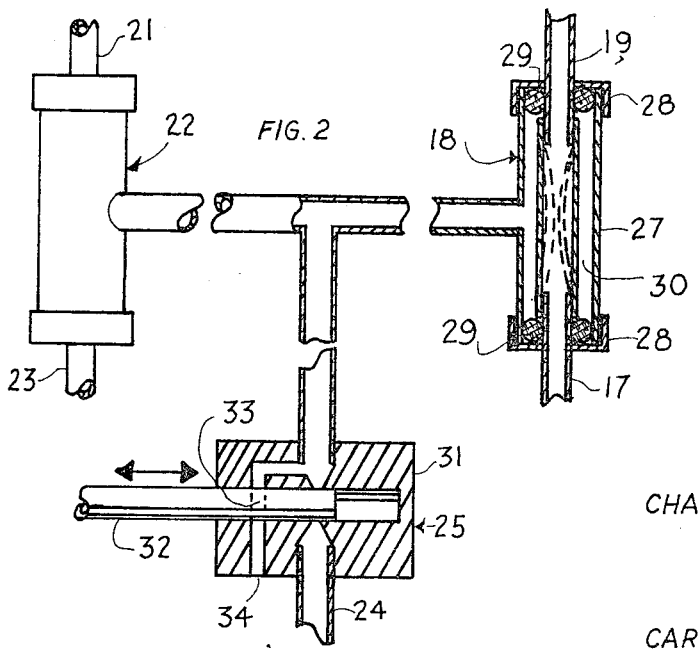
FIGURE 2 shows and explains certain valving details.

The purpose of tube 14 is to pass sampled gas to the analyzing system. For this purpose, tube 14 is connected to tube 17 and, through valve 18 and tube 19, to analyzer 20, typically an oxygen analyzer when the gas sampled is flue gas. Exit gas from analyzer 20 passes through tube 21, valve 22, and tube 23, to pot 6. Valves 18 and 22 (shown in detail in FIGURE 2) are controlled by air pressure, introduced through pipe 24 to a solenoid-operated valve 25, actuated by timer 26, as shown in FIGURE 2.

The operation of by-pass tube 15, controlled by adjustable valve 16, has previously been described to show its capability to control flow through tubes 9 and 14.

In actual use, the flows are as follows. With valves 18 and 22 open, the sampled gas flows through tubes 17 and 19, analyzer 20, and tubes 21 and 23 to pot 6. The end of tube 23 terminates below the surface of fluid in pot 6 by a distance, expressed as a pressure $\Delta P_3$. Since the submergence of tube 23 ($\Delta P_3$) is less than that of tube 5 ($\Delta P_2$) a flow is established from pot 4 through the analyzer 20, through pot 6, and tube 9 to the aspirator 10. The flow rate through the analyzer 20 can be observed as the bubbling rate from tube 23 in pot 6.

Desired flow rates can be achieved by adjusting the degree of submergence of tubes 3, 5, 23, to secure desired values of $\Delta P_1$, $\Delta P_2$ and $\Delta P_3$. To this end, and to facilitate observance, pots 5 and 6 are preferably of glass, with end closures through which the positions of tubes 3, 5, 23, and 7 can be adjusted.

Turning now to FIGURE 2, the valves 18, 22, and 25 are explained. In this figure, valve 18 is shown diagrammatically, in section. Valve 22, not detailed, is similar. Valve 18 comprises an external casing 27, closed by end caps 28. Tube 17 passes into one end of the valve casing, and terminates inside. Tube 19 similarly terminates inside 27 at the other end. Each of tubes 17 and 19 are sealed in place by compressible gasketing material indicated at 29, 29. Tubes 17 and 19 are connected by a collapsible tube 30. Valves 18 and 22 are operated by a solenoid-operated valve 25, shown in highly diagrammatic form. Valve 25 comprises a body 31, in which a piston 32 reciprocates, as moved by a solenoid coil (not shown), controlled by timer 26 (FIGURE 1). Piston 32 has an orifice 33, and valve body 31 has a passage 34, permitting opening of the interiors of valves 18 and 22 to the atmosphere when the solenoid is not energized and piston 32 is in the retracted position. Compressed air is led to valve body 31 by pipe 24. When the solenoid is energized and the piston 32 moves forward, orifice 33 admits compressed air to the interior of valves 18 and 22, collapsing tube 30, and shutting off sample flow. Piston 32 at this time closes orifice 34. Upon de-energizing the solenoid and retracting piston 32, air from 24 is sealed off, the air pressure in the valves 18 and 22 is released through 34, and the valves are opened.

Returning to FIGURE 1, tubes 35 and 36 serve only to indicate that analyzer 20 can be connected to other parallel sampling systems, and operation of the several systems can be controlled by appropriate scheduling with timer 26.

A major feature of this sampling system is that it can be so constructed that those portions which contact the sampled gas, which may be corrosive, are inert to corrosion. Such portions can be of glass or plastic. This permits observation of its operation to allow the following accomplishments.

The rate of flow of gases, i.e., total flow, by-pass flow, and sample flow can be readily observed and simply adjusted, as well as the vacuum achieved in the sample system by aspirator 10. Leak testing is also readily accomplished. If the sample probe is closed, and bubbles appear in pot 4, the sampling system leaks. If, with the sample tube 3 closed, valves 18 and 22 open, tube 17 pinched closed, and bubbles appear from tube 23, the analyzer system leaks.

Plugging of various portions of the system, and particularly of the sample probe are readily detected by observation of the bubbling rates and vacuum, and the system can readily be dismantled for back-flushing.

In flue gas testing the preferred fluid in pots 4, 6, and 8 is water. The sample is then water washed without undue solution of soluble components. Water in the sample condenses in pot 4, overflows through tube 5 to pot 6, then through tube 7 to pot 8.

Should small solid particles or droplets of condensate pass into tube 14, the Y-shaped connection between tube 15 and tube 17 will tend to cause them to continue down tube 15 toward aspirator 10, rather than to enter tube 17.

Should the system described be one of several units operated in parallel for observation of several items while using a single analyzer, the system may continue operation, thus assuring the analysis of a current, accurate sample when it is desired to analyze it.

It is to be understood that the system can be used for analysis of a variety of gases and particularly flue gas. Analyzer 20 can be of conventional design, selected for the determination of the concentration within the flue gas of the component or components under consideration. Generally, oxygen, carbon dioxide, carbon monoxide and hydrogen are components to be determined. Additionally, collapsible tubing 30 can comprise a suitable resilient deformable material, typical of which are natural rubber, synthetic rubbers such as butyl rubber, neoprene, and the like.

Numerous modifications and variations of the invention may be made without departing from the spirit and scope thereof. Accordingly, it is to be understood that the invention is not to be limited, but is to be construed in the light of the language of the appended claims.

I claim:
1. In a gas sampling system
   a gas sample probe communicating with
   a single means for creating a controlled vacuum to aspirate a gas sample,
   a first adjustable pressure differential means to create a pressure differential between said sample probe and the aspirator means,
   a second adjustable pressure differential means located between said sample probe and said first pressure differential means to create a region of intermediate pressure,
   a sample analyzing loop, including a selected analyzer, said loop leading from the region of intermediate pressure to a pressure region in communication with said aspirator means, and
   means for imposing an adjustable back pressure upon said sample analyzing loop.

2. The gas sampling system of claim 1 in which a bypass, including an adjustable valve, is placed between said sample analyzing loop and said aspirator means.

3. The gas sampling system of claim 1 in which a bypass, including an adjustable valve, is placed between said sample analyzing loop and said aspirator means, and in which isolating valves are placed in said sample analyzing loop before and after the selected analyzer.

4. In a gas sampling system, a sample probe tube leading to a closed container and terminating below the level of fluid therein, a second closed container, a tube for passage of gas and fluid extending from the first to the second container, extending upwardly in the first container to establish the level of fluid therein and terminating near the bottom of the second container, a third container, open to the atmosphere, a fluid passage tube extending upwardly into the second container to establish a fluid level therein and terminating below the level of fluid in the third container, a gas flow conduit leading from the top of the second container to means for establishing a partial vacuum within the system and drawing gas therethrough, a sample flow conduit loop leading from the top of the first container, passing through selected analyzing equipment, returning to the second container and terminating below the suface of fluid therein, and a by-pass gas conduit, containing an adjustable valve, communicating between the sample flow conduit loop and the gas conduit leading from the top of the second container to the vacuum producing means.

5. The system of claim 4 in which valve means are inserted in the sample flow conduit loop at points before and after the analyzer to permit isolating the analyzer while gas flow continues through the remainder of the system.

6. The system of claim 4 in which, with the adjustable valve in the by-pass conduit partially open, the total flow of gas from the sample probe tube is divided to flow partially through the sample flow conduit loop and partially through the conduit leading from the second container to the vacuum producing means.

7. The system of claim 4 in which the proportioning of gas flow between the sample flow conduit loop and the conduit leading from the second container to the vacuum producing means is controlled by the degree of immersion of the sample probe terminal in the first container, relative to the degree of immersion of the gas-fluid tube between the first and second containers below the fluid level in the second container, the degree of immersion of the sample flow conduit loop termination below the fluid end in the second container, and the degree of closure of the adjustable valve in the by-pass conduit.

8. In a gas sampling system
   (a) a gas sample probe communicating with
   (b) a single means for creating a controlled vacuum to aspirate a gas sample,
   (c) a first adjustable pressure differential means to create pressure differentials
      (1) between said sample probe and said aspirator means and
      (2) between the outlet means of a sample analyzing loop and said aspirator means,
   (d) a second adjustable pressure differential means located between said sample probe and said first pressure differential means to create a region of intermediate pressure,
(e) said sample analyzing loop including a selected analyzer leading from the region of intermediate pressure to a pressure region in communication with said aspirator means,
(f) means located between said region of intermediate pressure and said analyzer for removing liquid entrained in said gas sample, and
(g) means for imposing an adjustable back pressure upon said sample analyzing loop.

References Cited by the Examiner

UNITED STATES PATENTS

| | | | |
|---|---|---|---|
| 1,037,695 | 9/1912 | Westover | 73—421.5 |
| 2,575,240 | 11/1951 | Thompson. | |
| 2,814,952 | 12/1957 | Ryant et al. | 73—421.5 |
| 2,904,063 | 9/1959 | Wall et al. | 251—5 X |

LOUIS R. PRINCE, *Primary Examiner.*

S. C. SWISHER, *Assistant Examiner.*